US009632887B2

(12) United States Patent
Joshi et al.

(10) Patent No.: US 9,632,887 B2
(45) Date of Patent: Apr. 25, 2017

(54) AUTOMATIC CLIENT SIDE SEAMLESS FAILOVER

(71) Applicant: International Business Machines Corporation, Armonk, NY (US)

(72) Inventors: Vinayak Joshi, Bangalore (IN); Pallavi Priyadarshini, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 14/491,003

(22) Filed: Sep. 19, 2014

(65) Prior Publication Data

US 2016/0085646 A1 Mar. 24, 2016

(51) Int. Cl.
G06F 11/07 (2006.01)
G06F 11/20 (2006.01)

(52) U.S. Cl.
CPC ...... *G06F 11/2041* (2013.01); *G06F 11/2028* (2013.01); *G06F 2201/80* (2013.01)

(58) Field of Classification Search
CPC .................. G06F 11/2023; G06F 11/203
USPC .................................... 714/4.11, 6.3
See application file for complete search history.

(56) References Cited

U.S. PATENT DOCUMENTS

| 5,828,847 | A | 10/1998 | Gehr et al. |
| 6,856,591 | B1 | 2/2005 | Ma et al. |
| 7,444,335 | B1 | 10/2008 | Colrain et al. |
| 8,135,765 | B2 | 3/2012 | Schuler et al. |
| 8,312,318 | B2 | 11/2012 | Graham et al. |
| 8,429,450 | B2 | 4/2013 | Brown et al. |
| 9,195,528 | B1* | 11/2015 | Sarda ............... G06F 11/00 |
| 2002/0174420 | A1* | 11/2002 | Kumar ............... G06F 9/4446 717/174 |
| 2010/0042673 | A1* | 2/2010 | Dayley ............... G06F 11/2028 709/203 |
| 2011/0219121 | A1* | 9/2011 | Ananthanarayanan G06F 11/2033 709/227 |
| 2012/0066394 | A1* | 3/2012 | Revanuru ......... G06F 17/30286 709/226 |
| 2012/0331335 | A1 | 12/2012 | Judin et al. |

(Continued)

OTHER PUBLICATIONS

Appendix P—List of IBM Patents or Patent Applications Treated as Related.

(Continued)

*Primary Examiner* — Chae Ko
(74) *Attorney, Agent, or Firm* — L. Jeffrey Kelly

(57) ABSTRACT

A standby database cluster takes on the role of the primary database cluster if the primary database cluster becomes unavailable using the following steps: (i) operating a database management system (DBMS) including an initial primary cluster and a plurality of standby clusters; (ii) communicating to a set of client driver(s) connecting a first application to the initial primary cluster an identity of the plurality of standby clusters; (iii) on condition that the initial primary cluster becomes unavailable, assigning a selected standby cluster of the plurality of standby clusters to be assigned as a new primary cluster in place of the initial primary cluster; and (iv) in response to assignment of the new primary cluster, seamlessly moving the first application from the initial primary cluster to the new primary cluster without any substantial human intervention.

12 Claims, 4 Drawing Sheets

(56) References Cited

U.S. PATENT DOCUMENTS

| | | | |
|---|---|---|---|
| 2012/0331336 A1 | 12/2012 | Thiel et al. | |
| 2013/0007216 A1 | 1/2013 | Fries et al. | |
| 2013/0046731 A1 | 2/2013 | Ghosh et al. | |
| 2013/0066955 A1* | 3/2013 | Neel | H04L 67/146 709/203 |
| 2013/0346532 A1* | 12/2013 | D'Amato | G06F 3/0617 709/213 |
| 2014/0244680 A1* | 8/2014 | Chandran | G06F 17/30427 707/760 |
| 2015/0301910 A1* | 10/2015 | Sathyanarayana | G06F 11/1658 714/4.11 |
| 2015/0324259 A1* | 11/2015 | Bastawala | G06F 11/203 714/4.11 |

OTHER PUBLICATIONS

U.S. Appl. No. 14/735,382 entitled "Automatic Client Side Seamless Failover", filed Jun. 10, 2015.

IBM, "DB2 Version 10.5 Fix Pack 2 for Linux, UNIX, and Windows", Release Date: Oct. 10, 2013, Grace Period Disclosure Document, <http://www-01.ibm.com/support/docview.wss?uid=swg24035926>.

Oriani et al., "From Backup to Hot Standby: High Availability for HDFS", 2012 31st International Symposium on Reliable Distributed Systems, 1060-9857/12 © 2012 IEEE, DOI 10.1109/SRDS.2012.33, pp. 131-140.

"High Availability", DB2 10.5 for Linux, UNIX, and Windows, provided in search report by searcher dated Feb. 28, 2014, <http://pic.dhe.ibm.com/infocenter/db2luw/v10r5/topic/com.ibm.db2.luw.admin.ha.doc/doc/c0006354.html>.

"High Availability Solutions Overview", provided in search report by searcher dated Feb. 28, 2014, <http://msdn.microsoft.com/en-us/library/ms190202(v=sql.105).aspx>.

"How to Migrate Without Downtime", An Executive Overview, White Paper, Vision® Solutions, pp. 1-15, © Copyright 2013, Visions Solutions, Inc., provided in search report by searcher dated Feb. 28, 2014.

* cited by examiner

AUTOMATIC CLIENT SIDE SEAMLESS FAILOVER

The following disclosure(s) are submitted under 35 U.S.C. 102(b)(1)(A) as prior disclosures by, or on behalf of, a sole inventor of the present application or a joint inventor of the present application:

"DB2 Version 10.5 Fix Pack 2 for Linux, UNIX, and Windows", IBM, Release Date: 10 Oct. 2013.

BACKGROUND OF THE INVENTION

The present invention relates generally to the field of database failover and more particularly to database failover in systems with database management systems (DBMS) clusters.

In the field of computer science and computing, failover is defined as switching to a standby or redundant computer server, computer system, hardware component or computer network upon the failure or abnormal termination of a previously active application, server, system, network, or hardware component. Failover is typically applied automatically and usually operates without warning. Designers of computer systems typically provide failover capability in servers, systems or networks that require continuous availability. Likewise, failback is the process of restoring a system, network, service, or component, which is in a state of failover, back to its original state before the failure occurred.

At a server level, failover automation typically uses a physical connection between two (2) servers. As long as a connection remains between the main server and the second server, the second server will not initiate, or turn on, its systems. There may also be a third server that has running spare components for "hot switching" to prevent downtime. The second server takes over the work of the first server as soon as it detects an alteration in the connection of the first server. In addition, some systems have the ability to send a notification of failover.

Clustering is one of the common technologies adopted by DBMS (database management system) companies to obtain continuous database availability. Each cluster (herein also known as a group) consists of multiple database servers (also known as members). An advanced clustering configuration involves the existence of multiple clusters, where one cluster is active (called the primary), and the members within that cluster are responsible for servicing all applications with active transactions distributed among the members, according to different workload balancing algorithms. The remaining clusters are on standby and will take over the role of the primary cluster, only in the event the primary cluster goes down.

SUMMARY

According to an aspect of the present invention, there is a method, computer program product and/or system that performs the following steps (not necessarily in the following order): (i) operating a database management system (DBMS) including an initial primary cluster and a plurality of standby clusters; (ii) communicating to a set of client driver(s) connecting a first application to the initial primary cluster an identity of the plurality of standby clusters; (iii) on condition that the initial primary cluster becomes unavailable, assigning a selected standby cluster of the plurality of standby clusters to be assigned as a new primary cluster in place of the initial primary cluster; and (iv) in response to assignment of the new primary cluster, seamlessly moving the first application from the initial primary cluster to the new primary cluster. In some embodiments, the seamless movement is performed without any substantial human intervention (that is, with little, or no, human intervention).

DETAILED DESCRIPTION

Figure 1:
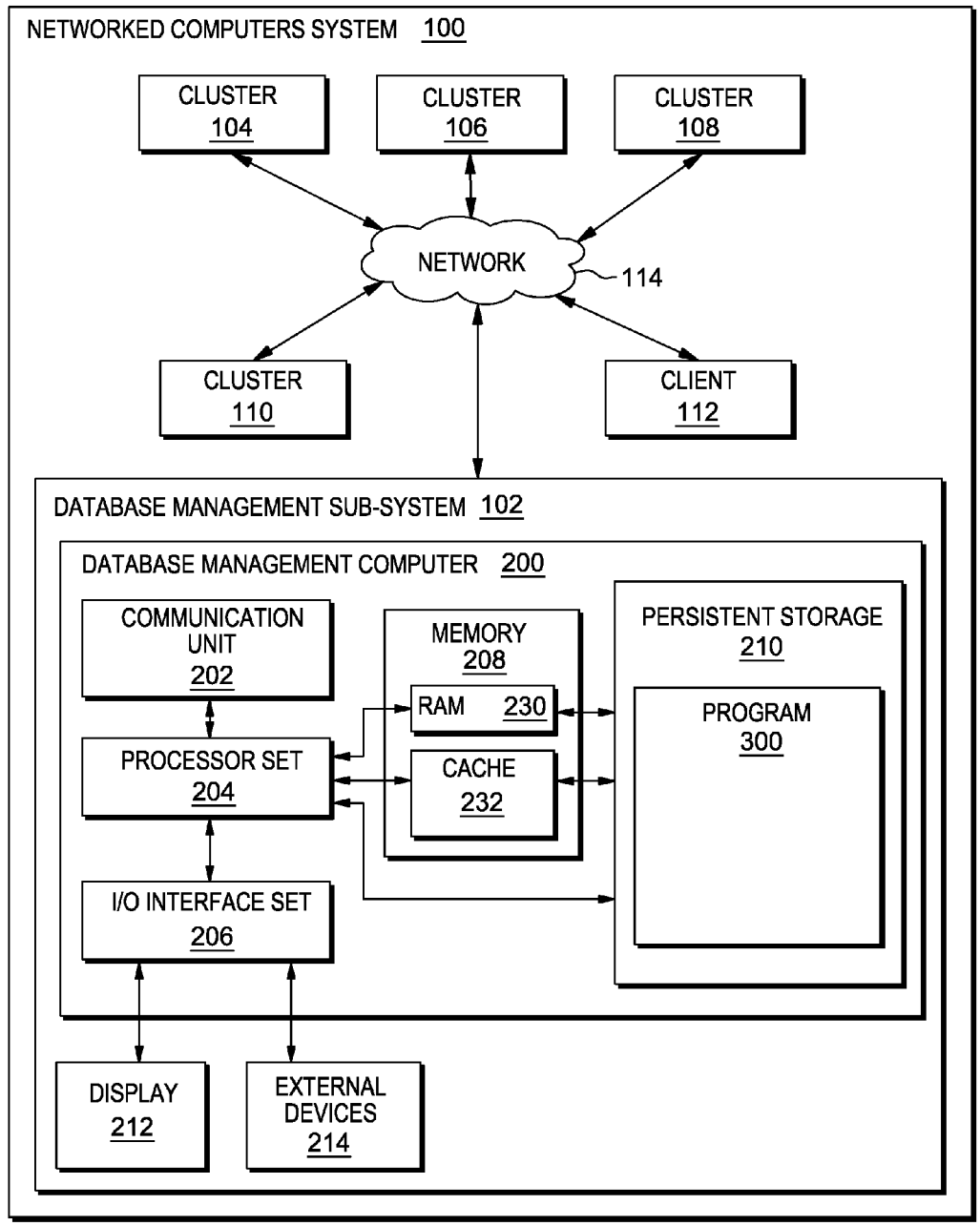
FIG. 1 is a schematic view of a first embodiment of a system according to the present invention.

In some embodiments of the present invention a standby database cluster takes on the role of the primary database cluster if the primary database cluster becomes unavailable. In some embodiments, applications move to the standby cluster without any substantial human intervention and without outage. In some embodiments, client drivers are configured in such a manner that when an application running on the primary cluster goes down, the client driver immediately cycles through the alternate clusters until another cluster is found to take on the role of the new primary cluster. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system (also sometimes referred to as "database system") 100, including: database management sub-system 102; data storage cluster sub-systems (or, more simply, clusters) 104, 106, 108, 110; client sub-system 112; communication network 114; database management computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
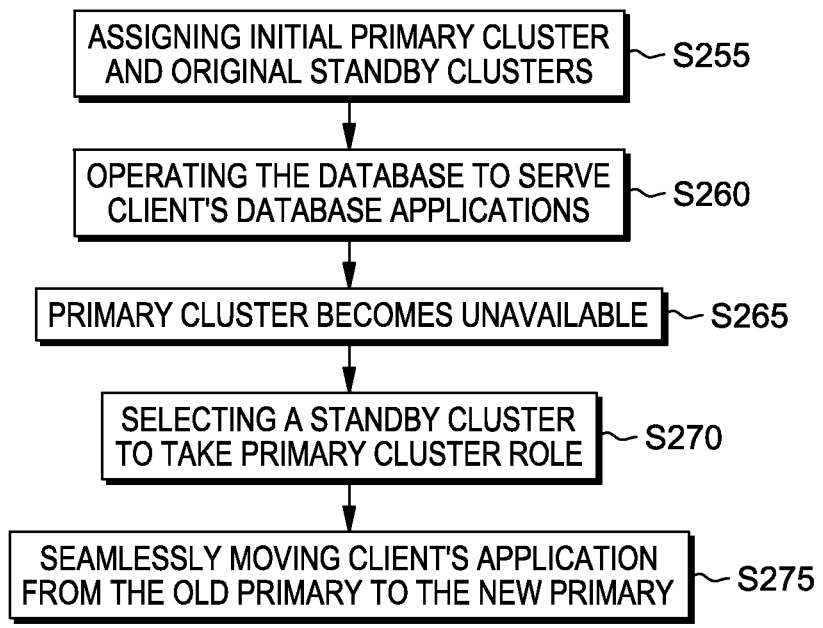
FIG. 2 is a flowchart showing a method performed, at least in part, by the first embodiment system.
Figure 3:
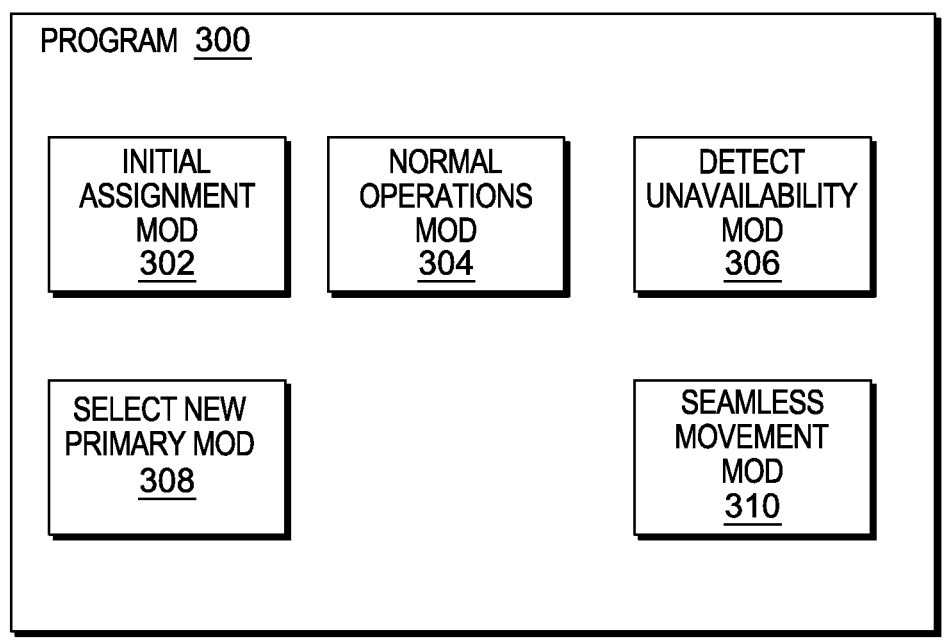
FIG. 3 is a schematic view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where initial assignment module ("mod") 302 assigns the clusters 104, 106, 108, 110 (see FIG. 1) to their respective roles. In this example, cluster 104 is assigned as the initial primary cluster role, and clusters 106, 108 and 110 (that is, the original standby clusters) are assigned to standby roles.

Processing proceeds to step S260, where normal operations mod 304 operates the database system so that initial primary cluster 104 is used as a database by applications running at client 112.

Processing proceeds to step S265, where detect unavailability mod 306 determines that the primary cluster has become unavailable. The manner in which primary cluster unavailability is detected will be further discussed, below, in the Further Comments And/Or Embodiment(s) sub-section of this Detailed Description section.

Processing proceeds to step S270, where select new primary mod 308 selects the new primary cluster from the original set of standby clusters 106, 108, 110 (see FIG. 1). The manner in which the new primary cluster is selected will be further discussed, below, in the Further Comments And/ Or Embodiment(s) sub-section of this Detailed Description section. In this example, cluster 110 is selected as the new primary cluster.

Figure 4:
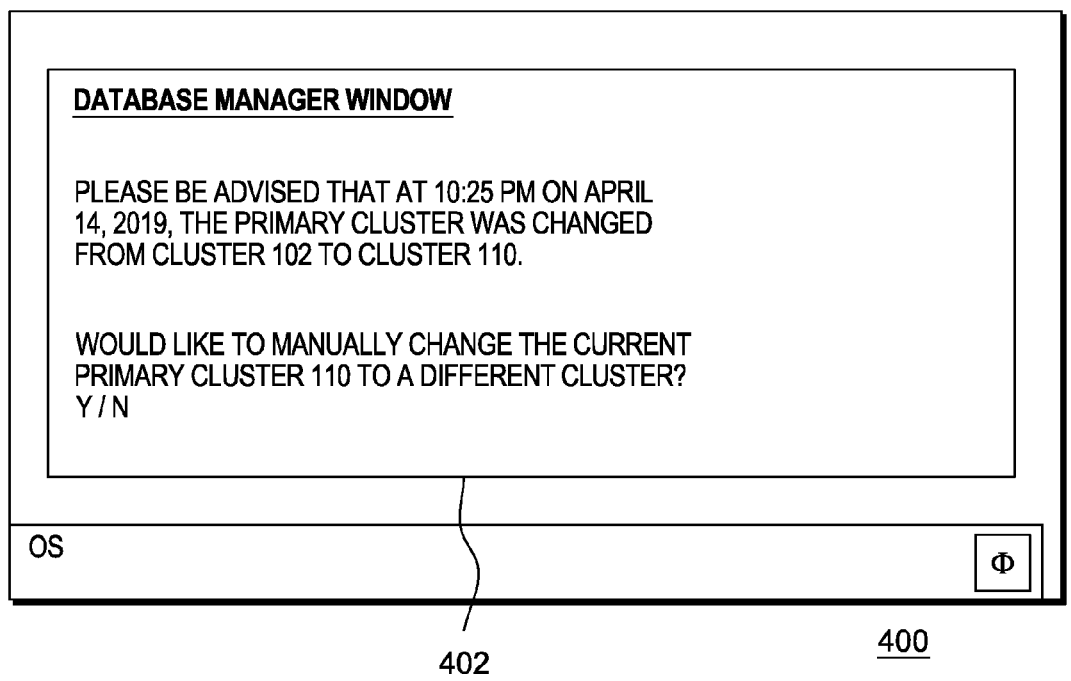
FIG. 4 is a screenshot view generated by the first embodiment system.

Processing proceeds to step S275, where seamless movement (see definition, below, in the Definitions sub-section of this Detailed Description section) mod 310 seamlessly moves the database accessing applications running on client 112 (see FIG. 1) from initial primary cluster 104 to new primary cluster 110. In this embodiment, a human database manager (not shown in the Figures) is notified of the switch through display device 212 (see FIG. 1), as shown at window 402 of screenshot 400 of FIG. 4.

III. Further Comments and/or Embodiments

Some embodiments of the present invention recognize the following facts, potential problems and/or potential areas for improvement with respect to the current state of the art: (i) existing sever side failover techniques using cluster (herein also known as a group) technology exhibit the limitation that only "new incoming" connections failover to the database cluster that has assumed the primary database role; (ii) connections that are servicing "existing applications" will return a connection failure message; and/or (iii) a side effect of a takeover mechanism is that "already connected" applications suffer connection failure leading to downtime.

Some embodiments of the present invention may include one, or more, of the following features, characteristics and/or advantages: (i) when a database takeover occurs with multiple database clusters (that is, a standby cluster takes on the role of the primary cluster if the primary cluster becomes unavailable) applications move seamlessly to the new standby database cluster without any intervention; (ii) when a database takeover occurs with multiple database clusters (that is, a standby cluster takes on the role of the primary cluster if the primary cluster becomes unavailable) applications move seamlessly to the new standby database cluster without any outage; (iii) the client drivers connecting the applications to the DBMS (database management system) cluster are configured with knowledge of the alternate clusters; (iv) when an application in the primary cluster goes down (none of its members are available), the client driver cycles through the alternate clusters until the software finds a cluster that can now become the new primary cluster, without returning a connection failure to the application; (v) any "in progress" transactions are failed over to a member within the new primary cluster, as long as conditions for safe failover are satisfied (for example, first SQL (structured query language) of a transaction); (vi) the choice of the member within the new primary cluster is determined by the workload balancing algorithm being used; and/or (vii) utilizing the automatic client side failover technique for multiple clusters, new connections, as well as existing connections experience little or no downtime or connection failure. More specifically with respect to item (v) on the foregoing list, in some embodiments, only SQL queries at a unit of work boundary (i.e. first SQL in a transaction) are eligible for a seamless failover.

Figure 5:
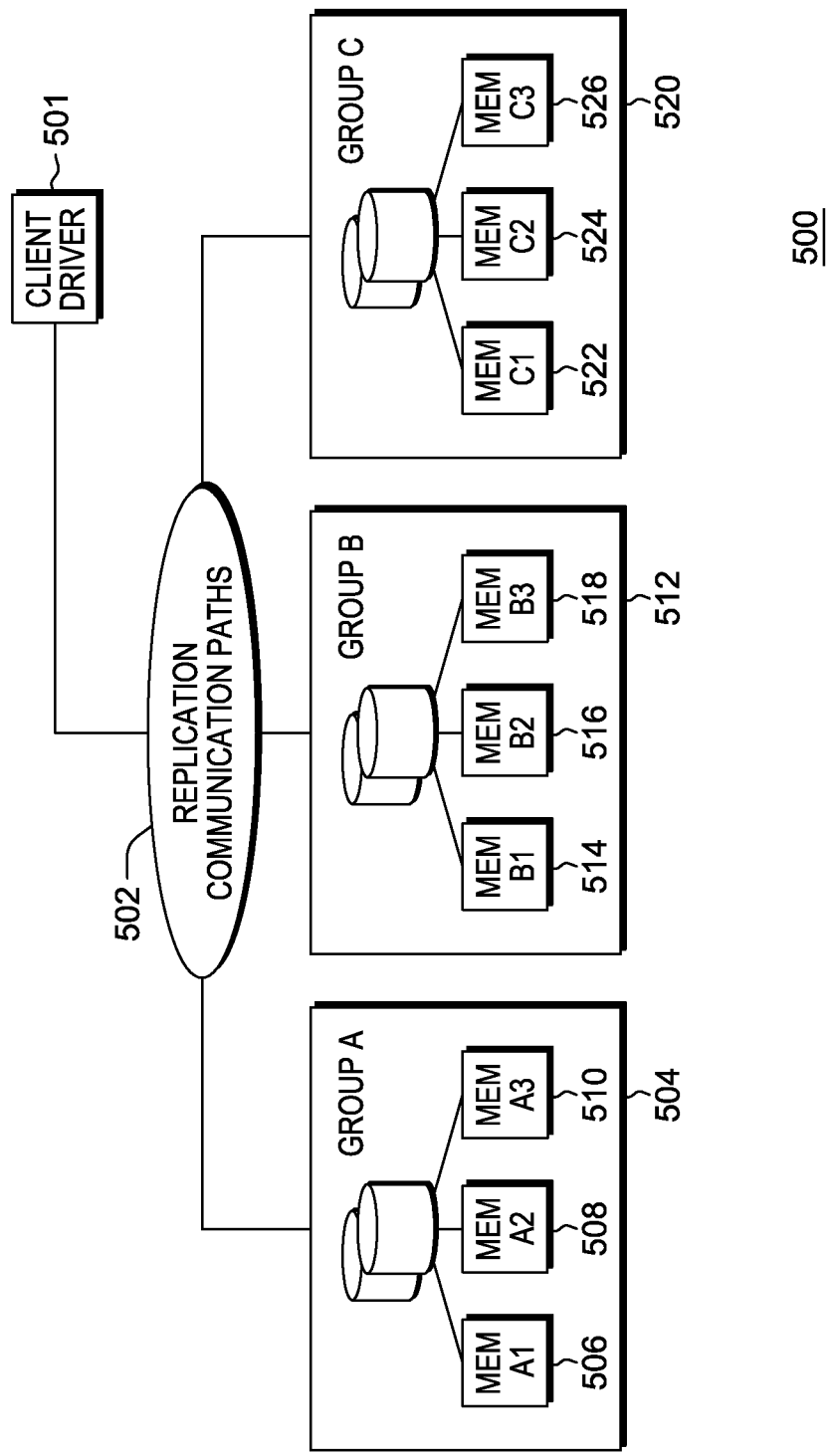
FIG. 5 is a schematic view of a second embodiment of a system according to the present invention.

As shown in FIG. 5, system 500 includes client driver 501, replication communication paths 502; database group A 504 (including members (herein also known as "mem") mem A1 506, mem A2 508, mem A3 510); database group B 512 (including mem B1 514, mem B2 516, mem B3 518); and database group C 520 (consisting of mem C1 522, mem C2 524, mem C3 526).

One embodiment of the present invention recognizes that within a database group or cluster, the database group members (such as mem A1 506, mem A2 508 and mem A3 510) are chosen according to existing workload balancing algorithms. The algorithm processing starts when the software client driver 501 connects the database clusters 504, 512, and 520 using replication communication paths 502 to the DBMS. Initially group A 504 is configured as the primary cluster. Group B 512 and group C 520 are specified as alternate clusters, in that order. Client driver 501 establishes the initial connection to mem A1 506 within group A 504. If group A 504 goes down (that is, none of the members in group A 504 are available), then group C 520 takes over the primary role. This process is described in the following paragraph.

Group A 504 switches to a standby role. Programming continues where an SQL operation is issued on the existing connection. The connection tries to acquire a socket transport to group A 504 mem A1 506, and receives an error stating that it is no longer the primary database. Client driver 501 gives up group A 504 immediately and moves to group B 512. The software attempts to connect to group B mem B1 514, and gets an error saying this group is not the primary database. Client driver 501 skips group B 512 and moves to group C 520. Client driver 501 then attempts connecting to mem C1 522 within group C 520. The software makes the connection, and the data is now routed to group C 520 mem C1.

Some embodiments of the present invention may further recognize a database client driver that can detect the switch of roles between clusters and seamlessly failover the connected applications to the new primary cluster without an application outage. In the event a failed primary cluster comes back up and re-acquires the role as the primary database, client connections will seamlessly failback to the new primary cluster.

Some embodiments of the present invention may further include one, or more, of the following features, characteristics and/or advantages, where the dynamic server switching system maintains a: (i) list in each client which identifies the primary server for that client; (ii) list in each client which identifies the preferred communication method; (iii) hierarchy of successively secondary servers; and/or (iv) hierarchy of communication method pairs.

Some embodiments of the present invention may further recognize that in the event the client does not have requests served by the designated primary server (or the designated communication method) the system traverses the list to ascertain the identity of the first available alternate server communication method pair, where the client uses this retrieved data to initiate future requests. The client periodically tests the primary server communication method pair to determine whether the fault has been cleared. If so, the client re-establishes the originally selected primary server communication method pair as the request route.

Some embodiments of the present invention may further include one, or more, of the following features, characteristics and/or advantages: (i) failover and failback is client based (in a clustered database environment) where a group of database servers is organized as a cluster; (ii) provides a database configuration tailored where many database servers are partitioned into clusters; (iii) provides one primary database cluster that contains preferred database servers; (iv) provides several alternate database clusters that act as secondary clusters; (v) uses improved client-server communication without manual intervention; (vi) the client moves connections to whichever cluster assumes the role of the primary cluster (in a dynamic cluster environment) where the server cluster can switch between primary and secondary roles depending upon availability; (vii) provides a method of detecting whether the primary cluster has come back up to initiate failback; and/or (viii) no polling is needed by the software to detect whether the original primary cluster has come back up.

Some embodiments of the present invention may further include one, or more, of the following features, characteristics and/or advantages: (i) the existence of a specialized client server protocol (for the currently connected primary cluster) to notify the client of the change in its role to secondary cluster when another cluster assumes the role as the primary cluster; (ii) routing of subsequent connections from the client to the new primary cluster; and/or (iii) the client server does not need to poll the designated primary server to detect revival. Further with regard to item (i), when the original primary cluster comes "back up" is a typical example of a specialized client server protocol used to notify the client of the change in its role.

Some embodiments of the present invention may further include one, or more, of the following features, characteristics and/or advantages: (i) group IP (internet protocol) addresses are dedicated to each cluster; (ii) external monitor software is not needed to detect node failures; (iii) no need for external monitor software to move the mobile IP around; (iv) IP addresses of alternate groups are configured at the client where the client itself can detect the failure of a connected primary database through information returned by the database server; (v) IP addresses of alternate groups retry the configured groups until the primary group is found; (vi) manages failovers between existing clusters of databases; (vii) manages how databases are added to clusters without affecting availability; (viii) applications are configured with the knowledge of high availability alternate clusters; (ix) using configuration, performs automatic failover of clients connected to a group of clusters (on the same platform) when the cluster loses the primary role; (x) using improved client-server communication, performs automatic failover of clients connected to a group of clusters (on the same platform) when the cluster loses the primary role; and/or (xi) performs communication between the client and the server.

Some embodiments of the present invention may further include one, or more, of the following features, characteristics and/or advantages: (i) manages failovers using direct connectivity between the client and the servers (where the software state between the database connections and failover is maintained rather than by using an intermediate proxy server); (ii) manages advanced communication between the end user client applications using backend databases to detect failures; (iii) enables failover of the client to the cluster that takes over the primary database role; (iv) works with pre-existing technology to implement high availability clusters on already available servers (such as a cluster of mainframes acting as a single system); (v) works with pre-existing technology to implement high availability clusters on already available servers (such as clustering technology that helps deliver high database availability); and/or (vi) enables automatic seamless failover between clusters without the need for any additional software. Further with regard to item (vi), a typical example of additional software that is not needed is proxy software, where pre-existing technology for enabling automatic cluster failover is already built into the end client database driver code and/or the database itself.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Seamlessly moving: Seamless means moving to another member without throwing an error back to the application and without any manual intervention.

What is claimed is:

1. A computer program product comprising a computer readable storage medium having stored thereon:
    first program instructions programmed to operate a database management system (DBMS) including an initial primary cluster and a plurality of standby clusters;
    second program instructions programmed to communicate to a set of client driver(s) connecting a first application to the initial primary cluster an identity of the plurality of standby clusters;
    third program instructions programmed to identify one or more internet protocol addresses, the one or more internet protocol addresses being associated with each of the plurality of standby clusters;
    fourth program instructions to select a standby cluster of the plurality of standby clusters as the primary standby cluster;
    fifth program instructions programmed to in response to the initial primary cluster being unavailable and subsequent to the selection of the primary standby cluster, assign the primary standby cluster as a new primary cluster in place of the initial primary cluster; and
    sixth program instructions programmed to in response to assignment of the new primary cluster,
        direct that a software state between the first application and the initial primary cluster be saved;
        determine which of the one or more internet protocol addresses is associated with the new primary cluster;
        direct the set of client driver(s) to communicate with the internet protocol addresses associated with the new primary cluster;
        select, based on a balancing load algorithm and an automatic failover technique, a member of the new primary cluster;
        fail over a first in-progress transaction of the first application to the selected member of the new primary cluster, in response to a predetermined set of requirement(s) for a safe failover being satisfied;
        notify, via an interface, a manager of the DBMS of the assignment to the new primary cluster; and
        prompt the manager of the DBMS whether to manually change from the new primary cluster to a different primary cluster.

2. The product of claim 1 wherein:
    the seamless movement of the first application occurs without any human intervention at all.

3. The product of claim 1 wherein:
    the seamless movement of the first application avoids an outage that would occur absent the seamless movement.

4. The product of claim 1 wherein the medium has further stored thereon:
    seventh program instructions programmed to determine that the initial primary cluster has become unavailable by determining that no members of a plurality of members of the initial first cluster are available for use by the DBMS.

5. The product of claim 1 wherein the medium has further stored thereon:
seventh program instructions programmed to cycle, by a first client driver of the set of client driver(s), through the standby clusters of the plurality of standby clusters without returning a connection failure to the first application; and
eighth program instructions programmed to find a standby cluster of the plurality of standby clusters that has been assigned as the new primary cluster.

6. The product of claim 1 wherein the medium has further stored thereon:
seventh program instructions programmed to on condition a predetermined set of requirement(s) for a safe failover are satisfied, failover a first in-progress transaction of the first application to a selected member of the new primary cluster.

7. The product of claim 6 wherein:
the predetermined set of requirements for a safe failover include that following: existence of a Structured Query Language (SQL) query at a unit of work boundary.

8. The product of claim 1 wherein the fifth program instructions are further programmed to seamlessly move the first application without any substantial human intervention.

9. A computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to operate a database management system (DBMS) including an initial primary cluster and a plurality of standby, clusters;
second program instructions programmed to communicate to a set of client driver(s) connecting a first application to the initial primary cluster an identity of the plurality of standby clusters;
third program instructions programmed to identify one or more internet protocol addresses, the one or more internet protocol addresses being associated with each of the plurality of standby clusters;
fourth program instructions programmed to determine whether one or more requests to the initial primary server by the set of client driver(s) are not served;
fifth program instructions programmed to in response to determining that the one or more requests to the initial primary server by the set of client driver(s) are not served, assign a selected standby cluster of the plurality of standby clusters to be assigned as a new primary cluster in place of the initial primary cluster; and
sixth program instructions programmed to in response to assignment of the new primary cluster,
direct that a software state between the first application and the initial primary cluster be saved;
determine which of the one or more internet protocol addresses is associated with the new primary cluster;
direct the set of client driver(s) to communicate with the internet protocol addresses associated with the new primary cluster;
select, based on a balancing load algorithm and an automatic failover technique, a member of the new primary cluster;
fail over a first in-progress transaction of the first application to the selected member of the new primary cluster, in response to a predetermined set of requirement(s) for a safe failover being satisfied;
notify, via an interface, a manager of the DBMS of the assignment to the new primary cluster; and
prompt the manager of the DBMS whether to manually change from the new primary cluster to a different primary cluster.

10. The system of claim 9 wherein the program instructions further include:
seventh instructions programmed to periodically check whether the initial primary server has become available; and
eighth instructions programmed to in response to determining that the initial primary server has become available, direct the set of client driver(s) to route future requests to the initial primary server.

11. The system of claim 9 wherein:
directing the set of client driver(s) to route future requests to the new primary cluster avoids an outage that would occur absent the seamless movement.

12. The system of claim 9 wherein the sixth program instructions are further programmed to direct the set of client driver(s) to route future requests to the new primary cluster such that the first application is seamlessly moved to the new primary cluster without any substantial human intervention.

* * * * *